United States Patent
Goodman et al.

(10) Patent No.: US 7,200,594 B2
(45) Date of Patent: Apr. 3, 2007

(54) METHOD OF PROVIDING ONLINE DATABASE CONTAINING PROPRIETARY INFORMATION

(75) Inventors: John F. Goodman, Stevenson, WA (US); Lenny L. Trapp, Hillsboro, OR (US)

(73) Assignee: Firestop Specialty Contractors, LLC, Hillsboro, OR (US)

( * ) Notice: Subject to any disclaimer, the term of this patent is extended or adjusted under 35 U.S.C. 154(b) by 564 days.

(21) Appl. No.: 10/389,555

(22) Filed: Mar. 14, 2003

(65) Prior Publication Data

US 2004/0181551 A1 Sep. 16, 2004

(51) Int. Cl.
*G06F 17/30* (2006.01)
*G06F 15/16* (2006.01)

(52) U.S. Cl. .................. 707/9; 707/2; 707/10; 709/217; 709/232

(58) Field of Classification Search ............... 707/1, 707/9, 104.1; 705/7; 709/217–219; 713/200–202, 713/157
See application file for complete search history.

(56) References Cited

U.S. PATENT DOCUMENTS

| | | | |
|---|---|---|---|
| 6,332,146 B1 * | 12/2001 | Jebens et al. ............ | 707/104.1 |
| 2001/0056362 A1 * | 12/2001 | Hanagan et al. ............ | 705/7 |
| 2001/0056435 A1 * | 12/2001 | Quick ................... | 707/104.1 |
| 2005/0177716 A1 * | 8/2005 | Ginter et al. ............. | 713/157 |

* cited by examiner

*Primary Examiner*—Etienne P LeRoux
*Assistant Examiner*—Hassan Tony Mahmoudi
(74) *Attorney, Agent, or Firm*—Chernoff, Vilhauer, McClung & Stenzel, LLP

(57) ABSTRACT

A method for making a particular customer's data on a database containing data for several customers available only to that customer. The data is formatted so that a selected group of data can be accessed by a specific customer by using an identifier which is unique to that customer's data.

6 Claims, 5 Drawing Sheets

FIG. 2

E.O.C.
Evidence of Compliance
[F S C]

EOC by: Location ~ Area
Request for assistance, click [here]

| Site Location | Location Detail | | | Referenced Facility | Address | City | State |
|---|---|---|---|---|---|---|---|
| 1st Floor | Unknown | | | ABC Hospital | 18800 NE 25th Ave. | Hillsboro | OR |

| Area | Sub Location |
|---|---|
| LL7 | Hallway |
| F22 | Receiving |
| F23 | Receiving |
| G22 | Receiving |

[EXIT]

| Log # | Pre Pic Log | Post Pic Log | Log Date | Log Type | Quantity | FS Brand | UL System | FS Rating | Std Comments | Recertify | Job No. |
|---|---|---|---|---|---|---|---|---|---|---|---|
| 1355 | | 4587 | 1/2/2003 | Insulated Pipe | 1 | STI-1 | WL5121 | 1 | Completed | No | OTH011202 |
| 1356 | | 4588 | 1/2/2003 | Conduit | 1 | STI-1 | WL1222 | 1 | Completed | No | OTH011202 |
| 1357 | | 4589 | 1/2/2003 | Black Iron | 1 | 3M-1 | WL1001 | 1 | Completed | No | OTH011202 |
| 1358 | | 4589 | 1/2/2003 | Insulated Pipe | 1 | 3M-1 | WL5039 | 1 | Completed | No | OTH011202 |
| 1359 | | 4589 | 1/2/2003 | Black Iron | 1 | 3M-1 | WL1001 | 1 | Completed | No | OTH011202 |

METHOD OF PROVIDING ONLINE DATABASE CONTAINING PROPRIETARY INFORMATION

BACKGROUND AND SUMMARY OF THE INVENTION

This invention relates to a method for making data available online, and, in particular, to making proprietary data available online on a customer-specific basis.

There are many situations where a business would like to have available in a single place concise, systematic data relating to some aspect of its business. While the business could build its own database, doing so is time-consuming and expensive. Thus, a business opportunity exists in providing such a database for others. However, the only way it would be feasible to do this would be for the database to include data for a large number of customers. The difficulty is that each customer's data may be proprietary to that customer and the customer would not want other customers to be able to access it.

The subject invention overcomes this difficulty by providing an online database containing customer-specific data relating to a plurality of customers. The database is formatted to allow a customer to access a selected group of data which is relevant to that customer by utilizing a unique identifier.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIGS. 2–5 are screen displays utilized in the subject invention.

DETAILED DESCRIPTION OF A PREFERRED EMBODIMENT

Figure 1:
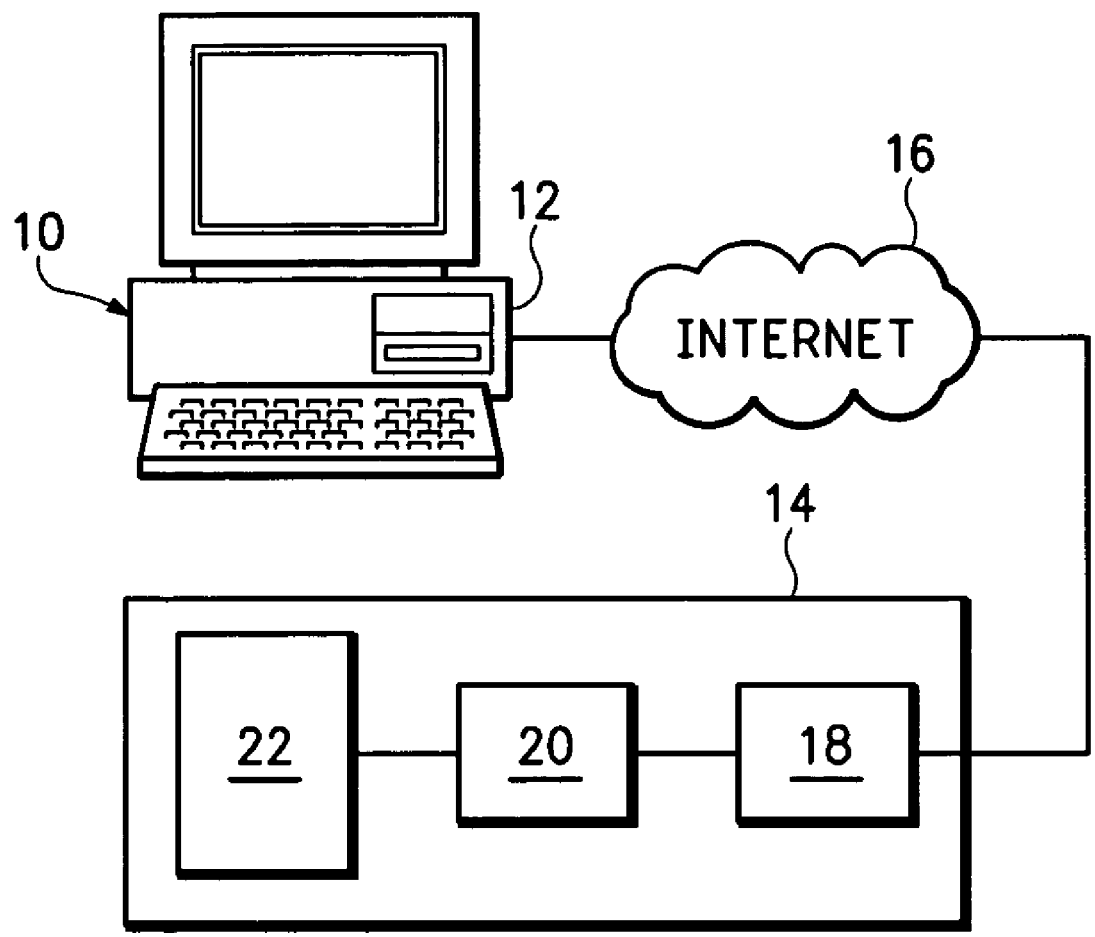
FIG. 1 is a schematic view of a computer system that supports the subject invention.

The subject invention provides a method whereby a company, hereinafter referred to as "provider," provides its customers with information, such as details of fire safety compliance of the customer's facility, on a need-to-know basis, over a global computer network such as the Internet. FIG. 1 of the drawings is a schematic of a computer system that supports the subject invention. The system includes a customer computer system 10, which could be a stand-alone computer 12 as shown or an extensive computer network. The customer computer system is connected to a provider computer system 14 through the Internet 16. While the term Internet commonly refers to the Worldwide Web, as used herein, it encompasses any system whereby remote computer systems can communicate with one another. The provider computer system 14 is a general purpose computer which includes, among other things, a Web server 18 which is configured to communicate through the Internet, a computer program 20 and a database 22.

When the method is used to provide information about fire safety compliance, the provider first makes a visual inspection of a customer's facility and records all pertinent information about firestop barriers, or the lack of firestop barriers, at every location where there is a penetration that requires such a barrier. This inspection can be part of an initial installation of firestop barriers in a new facility, part of an updating of firestop barriers in an existing facility, or a stand-alone inspection of an existing facility. Alternatively, this information can be given to the provider by the customer. All relevant data relating to firestops will be recorded and indexed by location. In the case of new installations, the information can include the installation date, the particular material or materials used and the specification of these materials. It also can include reinspection dates. In the case of a new installation, a label recording the installation date and materials may be placed next to the installation. Digital photographs are also taken of each installation and the program indexes the photographs relative to the textual information for each location. The textual information and photographs are placed in the database 22 along with similar information for other customers.

Figure 3:
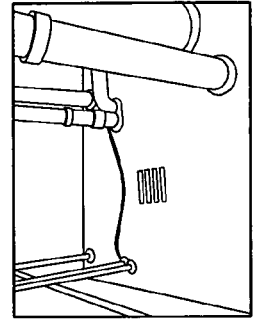
Figure 4:
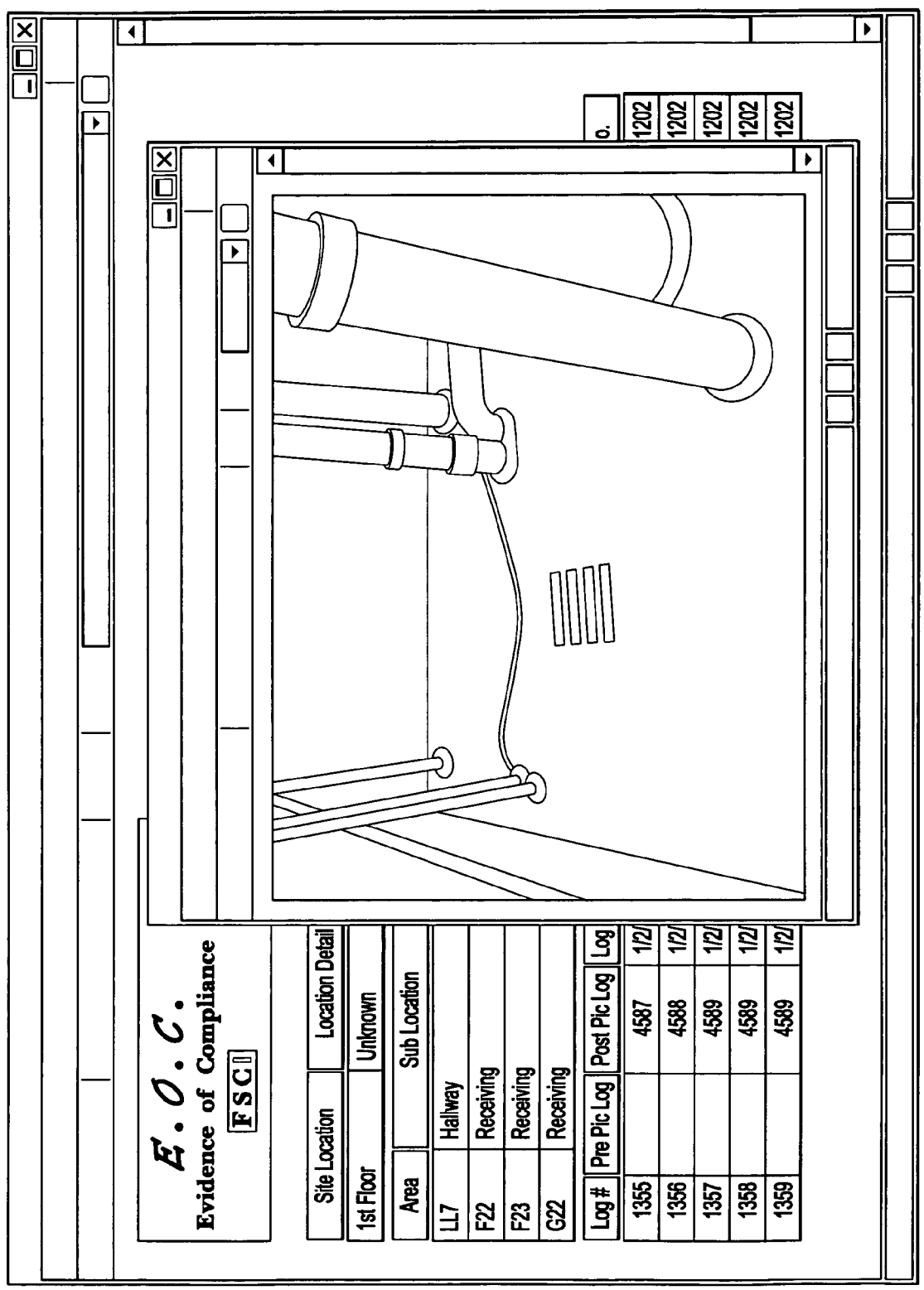
Figure 5:
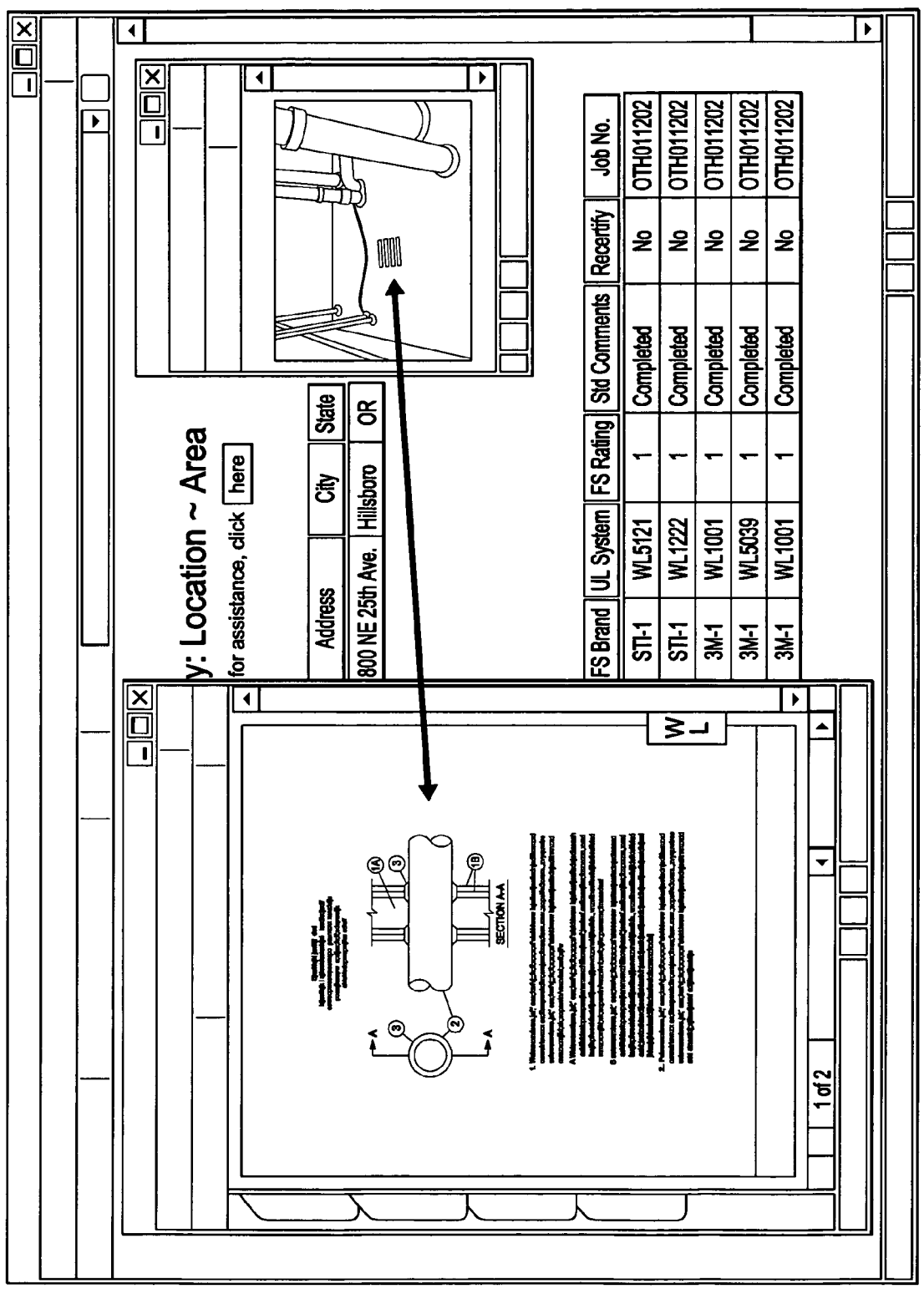

The program 20 formats this material such that the information for each customer is accessible only to that customer. Each customer is provided with a unique identifier which allows that customer to access its data. The identifier may have two components. A first component is a customer name and all of the information relating to that customer is associated with its customer name. The second component is a key. A particular key allows access to all or only a portion of the information relating to that customer. This allows the customer to restrict what information a particular user has access to. The database also includes a diagram, or floor plan, of each facility. The location of each firestop barrier in the facility is shown on the diagram. The database is programmed such that by clicking on any location in the database the textual information, and photographs for that location, are shown. The database also includes a penetration log, FIG. 2, which lists every penetration in the facility by building, floor and location on the floor. Clicking on any listing in the penetration log will display the photograph for that location, FIG. 3. If desired, this photograph can be enlarged to show details, FIG. 4. By clicking on the photograph the textual information for that location is displayed, FIG. 5.

The database also can be programmed to accept information from the customer, such as a work order informing the provider that a new penetration or penetrations have been made in the facility and the location of these penetrations. The provider then will install firestop barriers at these locations for the customer.

The database can also contain information regarding firestop barriers installed by the provider that is accessible only by a database administrator who is employed by the provider, and not by the customer. This portion of the database could include such things as the installer's notes, problems encountered, etc. In addition to being an easily accessible storage place, such information could be valuable if the compliance of a firestop came into question. This information would not be of general interest to the customer, however.

While the proceeding description relates to firestop barriers, the method of the subject invention can be employed by a provider to provide almost any type of data to its customers. In general, the invention relates to a method for making any proprietary information available to customers on a customer-specific basis and on a need-to-know basis. This is accomplished by providing an online database containing information relating to multiple customers which is formatted such that each customer can only access the data relevant to it through an identifier unique to that customer. This identifier could include a customer name which relates to all of the data for that customer and a key which allows access to all or some portion of the data for a particular user. Thus, the customer can allow different people to access different groups of its data.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method for making proprietary data available to customers on a customer-specific basis, comprising:
 a. Providing an online database containing customer-specific data relating to a plurality of customers;
 b. Formatting the data such that a selected group of said data, which is relevant only to a specific customer, is configured to be accessed by inputting a unique identifier;
 c. Providing appropriate ones of said identifiers to said customers on an individual basis, thereby ensuring any one of said plurality of customers only accesses data which is relevant to that customer;
 d. Wherein the database includes a diagram of a facility and data associated with a particular location on said diagram is configured to be accessed directly from the diagram; and
 e. Wherein said identifier includes a customer name and a key so that each customer has multiple keys, each of which permits access only to a portion of the data that is relevant to that customer.

2. The method of claim 1 wherein the database also includes internal data relating to each customer which is configured not to be accessed by the customer and is configured to be accessed only by a database administrator.

3. The method of claim 1 wherein said data includes both textual material and related photographs.

4. The method of claim 3 wherein the photographs are indexed relative to the related textual material and the customer views the related textual material directly from the photographs.

5. The method of claim 1 wherein the database includes reminders of tasks that need to be completed.

6. The method of claim 5 wherein said reminders are added to the database and upgraded by the customer.

* * * * *